US011931906B2

(12) United States Patent
Choi et al.

(10) Patent No.: US 11,931,906 B2
(45) Date of Patent: Mar. 19, 2024

(54) MOBILE ROBOT DEVICE AND METHOD FOR PROVIDING SERVICE TO USER

(71) Applicant: Samsung Electronics Co., Ltd., Suwon-si (KR)

(72) Inventors: Hyunmi Choi, Suwon-si (KR); Heeju Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 17/040,211

(22) PCT Filed: Apr. 2, 2019

(86) PCT No.: PCT/KR2019/003888
§ 371 (c)(1),
(2) Date: Sep. 22, 2020

(87) PCT Pub. No.: WO2019/208950
PCT Pub. Date: Oct. 31, 2019

(65) Prior Publication Data
US 2021/0008723 A1    Jan. 14, 2021

(30) Foreign Application Priority Data

Apr. 25, 2018  (KR) .................. 10-2018-0047650

(51) Int. Cl.
*B25J 9/16*    (2006.01)
*B25J 5/00*    (2006.01)
(Continued)

(52) U.S. Cl.
CPC ............. *B25J 9/1676* (2013.01); *B25J 5/007* (2013.01); *B25J 9/1651* (2013.01); *B25J 9/1664* (2013.01);
(Continued)

(58) Field of Classification Search
CPC ........ B25J 9/1676; B25J 5/007; B25J 9/1651; B25J 9/1664; B25J 9/1697; B25J 11/008;
(Continued)

(56) References Cited

U.S. PATENT DOCUMENTS 9,043,025 B2    5/2015  Brooks et al.
9,475,200 B2 *  10/2016 Schlaich ................ B25J 9/1674
(Continued)

FOREIGN PATENT DOCUMENTS

CN    104870147 A    8/2015
CN    106003047 A    10/2016
(Continued)

OTHER PUBLICATIONS

Machine translation of WO-2018066837-A1.*
(Continued)

*Primary Examiner* — Robert T Nguyen
(74) *Attorney, Agent, or Firm* — Jefferson IP Law, LLP

(57) ABSTRACT

Provided are an artificial intelligence (AI) system utilizing a machine learning algorithm such as deep learning and an application thereof. A method of providing, by a mobile robot device including an arm device, a service to a user includes obtaining sensing information obtained by sensing a surrounding environment of the mobile robot device while the mobile robot device is traveling, changing, based on the sensing information which has been obtained by sensing, a safety operation level of the mobile robot device, and controlling, based on the changed safety operation level, an operation of the mobile robot device, wherein the safety operation level is a level for controlling an operation related to a movement of the mobile robot device and a motion of the arm device, and the mobile robot device changes the
(Continued)

safety operation level by applying the obtained sensed information to a training model trained using an artificial intelligence algorithm.

13 Claims, 16 Drawing Sheets

(51) Int. Cl.
B25J 11/00 (2006.01)
B25J 19/02 (2006.01)

(52) U.S. Cl.
CPC ........... B25J 9/1697 (2013.01); B25J 11/008 (2013.01); B25J 19/02 (2013.01)

(58) Field of Classification Search
CPC ....... B25J 19/02; B25J 5/00; B25J 9/16; B25J 9/163; B25J 11/00; B25J 19/06; B25J 9/1674

See application file for complete search history.

(56) References Cited

U.S. PATENT DOCUMENTS

| | | | |
|---|---|---|---|
| 9,636,822 | B2 | 5/2017 | Song et al. |
| 9,751,212 | B1 | 9/2017 | Martinson et al. |
| 9,776,323 | B2 | 10/2017 | OSullivan et al. |
| 2010/0063627 | A1 | 3/2010 | Kitahama |
| 2015/0183112 | A1 | 7/2015 | Song et al. |
| 2016/0214263 | A1* | 7/2016 | Terada ..................... B25J 19/06 |
| 2017/0113348 | A1 | 4/2017 | Monceaux et al. |
| 2017/0190051 | A1* | 7/2017 | O'Sullivan .............. G06N 7/01 |
| 2017/0225331 | A1 | 8/2017 | Sussman et al. |
| 2017/0315559 | A1* | 11/2017 | Etoh ......................... B60R 1/00 |
| 2018/0181133 | A1* | 6/2018 | Zhang .................. G05D 1/0217 |
| 2018/0182241 | A1* | 6/2018 | Ahn ........................ B60K 35/00 |
| 2019/0196495 | A1 | 6/2019 | Noh et al. |
| 2019/0224850 | A1* | 7/2019 | Honeck .................. G05D 1/028 |
| 2020/0164515 | A1* | 5/2020 | Han ........................ B25J 13/089 |
| 2020/0189117 | A1* | 6/2020 | Ha .......................... B25J 9/1669 |
| 2020/0238538 | A1* | 7/2020 | Iida ........................ B25J 9/1674 |
| 2021/0001482 | A1 | 1/2021 | Tsuda et al. |
| 2021/0182707 | A1* | 6/2021 | Weyrich ................. G06N 20/00 |
| 2021/0286981 | A1* | 9/2021 | Fujii ....................... G06V 40/16 |
| 2022/0206506 | A1* | 6/2022 | Taira .................... G05D 1/0223 |
| 2022/0305680 | A1* | 9/2022 | Turpin ..................... B25J 19/06 |

FOREIGN PATENT DOCUMENTS

| | | | |
|---|---|---|---|
| CN | 107214705 A | 9/2017 | |
| CN | 107466263 A | 12/2017 | |
| CN | 107932560 A | 4/2018 | |
| JP | 2002-307340 A | 10/2002 | |
| JP | 2008-307658 A | 12/2008 | |
| JP | 2011-042011 A | 3/2011 | |
| JP | 2011-224679 A | 11/2011 | |
| JP | 2017-030137 A | 2/2017 | |
| JP | 2017-200718 A | 11/2017 | |
| KR | 10-1190660 B1 | 10/2012 | |
| KR | 10-2012-0135935 A | 12/2012 | |
| KR | 10-2017-0027707 A | 3/2017 | |
| KR | 10-2018-0023301 A | 3/2018 | |
| WO | 2018/038551 A1 | 3/2018 | |
| WO | WO-2018066837 A1 * | 4/2018 | ............. B25J 11/00 |

OTHER PUBLICATIONS

Korean Office Action dated Jul. 6, 2022, issued in a counterpart Korean Application No. 10-2018-0047650.
Chinese Office Action dated Feb. 21, 2023, issued in Chinese Patent Application No. 201980028288.4.
International Search Report dated Jul. 4, 2019, issued in an International Application No. PCT/KR2019/003888.
European Extended Search Report dated Apr. 8, 2021, issued in a counterpart European Application No. 19791944.2-1016 / 3753688.
Guo Jia et al: "A design of multi-vision localization and navigation service robot system", 2017 12th International Conference on Computer Science and Education (ICCSE), IEEE, Aug. 22, 2017, pp. 787-790, XP033240953, DOI: 10.1109/ICCSE.2017.8085601 [retrieved on Oct. 26, 2017].
Chinese Office Action dated Jul. 12, 2023, issued in Chinese Application No. 201980028288.4.

* cited by examiner

FIG. 9

| SAFETY OPERATION LEVEL | MOVING SPEED | MOVING DIRECTION | ARM SPEED | ARM ANGLE | MOVING NOISE | NOTIFICATION |
|---|---|---|---|---|---|---|
| 1 | 48 m/min | FORWARD | 5cm/sec | 90 DEGREES | K db | DISPLAY |
| 2 | 25 m/min | FORWARD/ RIGHT/LEFT | 4cm/sec | 40 DEGREES | K +0.5 db | DISPLAY |
| ⋮ | | | | | | |
| N | 10 m/min | BACKWARD /TURN | 1cm/sec | MANUAL | K +2 db | DISPLAY AND AUDIO |

900

MOBILE ROBOT DEVICE AND METHOD FOR PROVIDING SERVICE TO USER

TECHNICAL FIELD

The present disclosure relates to a mobile robot device and method for providing a service to a user, and more particularly, to a mobile robot device and method for safely providing a service to a user by sensing a surrounding environment while the mobile robot device is traveling.

BACKGROUND ART

An artificial intelligence (AI) system is a computer system that implements human-level intelligence, in which, unlike an existing rule-based smart system, the AI system trains by itself, makes decisions, and becomes increasingly smarter. As the AI system is used, the recognition rate is improved and a user's taste can be understood more accurately, and thus, the existing rule-based smart system is gradually being replaced by a deep learning-based AI system.

AI technology is configured by machine learning (deep learning) and element technology utilizing machine learning.

Machine learning is an algorithm technology for classifying/training the characteristics of input data autonomously, and element technology is a technology for simulating functions such as cognition and judgment of the human brain by using machine learning algorithms such as deep learning, and includes technical fields such as linguistic understanding, visual understanding, inference/prediction, knowledge expression, and motion control.

The various fields in which AI technology is applied are as follows. Linguistic understanding is a technology for recognizing and applying/processing human language/characters, and includes natural language processing, machine translation, conversation system, question and answer, and speech recognition/synthesis. Visual understanding is a technology for recognizing and processing objects as human vision, and includes object recognition, object tracking, image search, human recognition, scene understanding, spatial understanding, and image improvement. Inference prediction is a technology for logically inferring and predicting information by determining information, and includes knowledge/probability-based inference, optimization prediction, preference-based planning, and recommendation. Knowledge expression is a technology for automatically processing human experience information into knowledge data, and includes knowledge building (data generation/classification), knowledge management (data utilization), and so on. Motion control is a technology for controlling autonomous driving of a vehicle and movement of a robot, and includes motion control (navigation, collision, traveling), operation control (behavior control), and the like.

With the development of multi-media technology and network technology, users can be provided with various services using mobile robot devices.

However, in the related art, although a safety mechanism has been developed, there is a problem that the possibility of an accident due to a malfunction of the mobile robot device cannot be excluded. Accordingly, there is a need for a technology that allows a user to be provided with a service safely and effectively by controlling a mobile robot device in consideration of the large damage that may be caused by a malfunction of the mobile robot device.

DESCRIPTION OF EMBODIMENTS

Technical Problem

Provided are a mobile robot device and method for providing a service to a user using a training model trained using an artificial intelligence algorithm.

Solution to Problem

According to a first aspect of the disclosure, a mobile robot device including an arm device for providing a service to a user may include a memory configured to store at least one instruction, a sensing unit, and a processor configured to, by executing the at least one instruction, obtain, through the sensing unit, sensing information obtained by sensing a surrounding environment of the mobile robot device while the mobile robot device is traveling, to change, based on the sensing information which has been obtained by sensing, a safety operation level of the mobile robot device, and to control an operation of the mobile robot device based on the changed safety operation level, wherein the safety operation level is a level for controlling an operation related to a movement of the mobile robot device and a motion of the arm device, and the mobile robot device changes the safety operation level by applying the obtained sensing information to a training model trained using an artificial intelligence algorithm.

According to a second aspect of the disclosure, a method of providing, by a mobile robot device including an arm device, a service to a user may include obtaining sensing information obtained by sensing a surrounding environment of the mobile robot device while the mobile robot device is traveling, changing, based on the sensing information which has been obtained by sensing, a safety operation level of the mobile robot device, and controlling, based on the changed safety operation level, an operation of the mobile robot device, wherein the safety operation level is a level for controlling an operation related to a movement of the mobile robot device and a motion of the arm device, and the mobile robot device changes the safety operation level by applying the obtained sensing information to a training model trained using an artificial intelligence algorithm.

According to an aspect of the disclosure, a computer-readable recording medium on which a program for executing the method of the second aspect on a computer is recorded may be provided.

Advantageous Effects of Disclosure

A mobile robot device that senses the surrounding environment while traveling can safely provide a service to a user.

BRIEF DESCRIPTION OF DRAWINGS

FIG. 9 is a diagram illustrating a table showing an example of an operation of a mobile robot device according to a safety operation level, according to some embodiments.

BEST MODE

Figure 1:
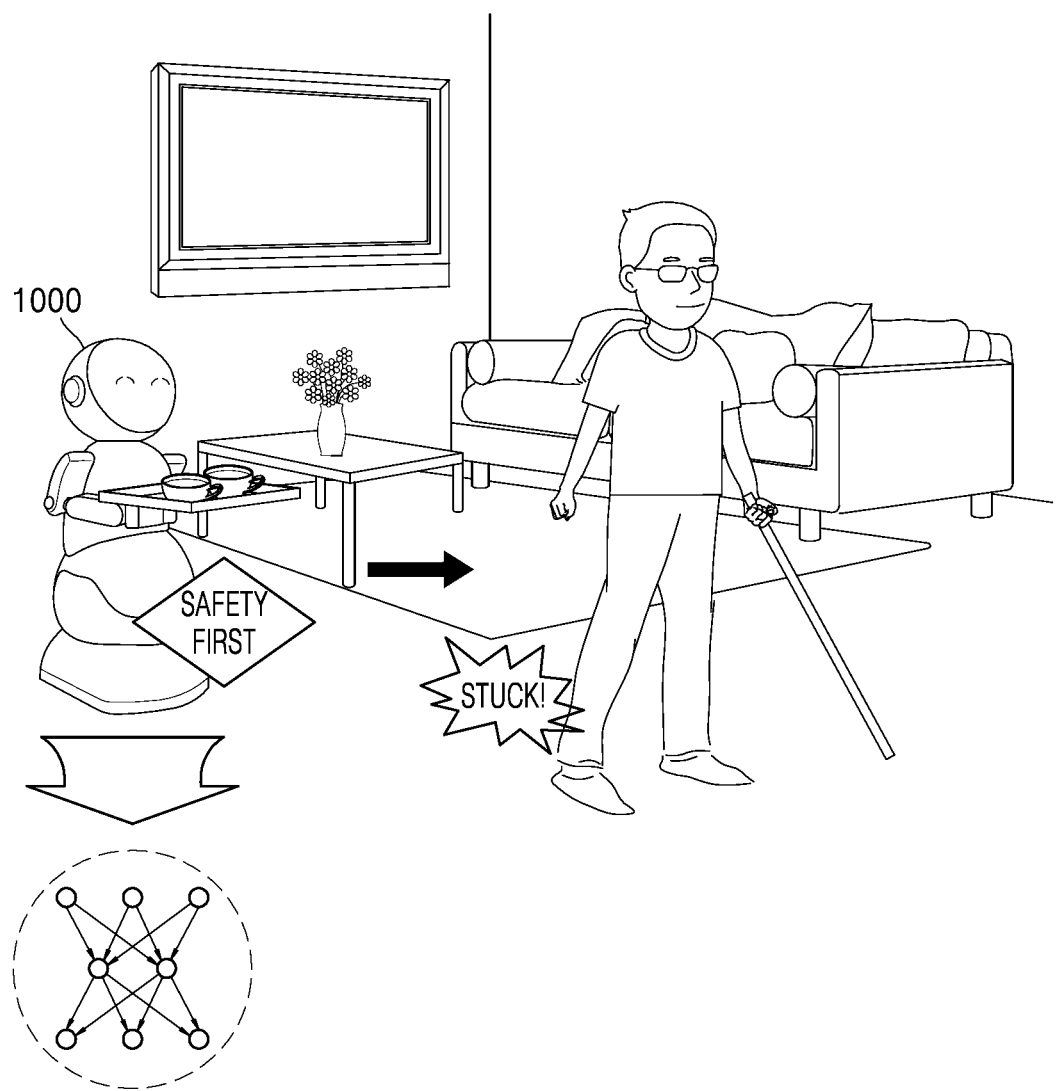
FIG. 1 is a diagram illustrating an example in which a mobile robot device 1000 provides a service to a user, according to some embodiments.

A method of providing, by a mobile robot device including an arm device, a service to a user, according to an embodiment of the disclosure, may include obtaining sensing information obtained by sensing a surrounding environment of the mobile robot device while the mobile robot device is traveling, changing, based on the sensing information which has been obtained by sensing, a safety operation level of the mobile robot device, and controlling, based on the changed safety operation level, an operation of the mobile robot device, wherein the safety operation level is a level for controlling an operation related to a movement of the mobile robot device and a motion of the arm device, and the mobile robot device changes the safety operation level by applying the obtained sensing information to a training model trained using an artificial intelligence algorithm.

A mobile robot device including an arm device for providing a service to a user according to an embodiment of the disclosure may include a memory configured to store at least one instruction, a sensing unit, and a processor configured to, by executing the at least one instruction, obtain, through the sensing unit, sensing information obtained by sensing a surrounding environment of the mobile robot device while the mobile robot device is traveling, to change, based on the sensing information which has been obtained by sensing, a safety operation level of the mobile robot device, and to control an operation of the mobile robot device based on the changed safety operation level, wherein the safety operation level is a level for controlling an operation related to a movement of the mobile robot device and a motion of the arm device, and the mobile robot device changes the safety operation level by applying the obtained sensing information to a training model trained using an artificial intelligence algorithm.

MODE OF DISCLOSURE

Hereinafter, embodiments of the disclosure will be described in detail with reference to the accompanying drawings so that those skilled in the art to which the disclosure pertains may easily practice. However, the disclosure can be implemented in many different forms and is not limited to the embodiments described herein. In addition, in order to clearly describe the disclosure in the drawings, parts irrelevant to the description are omitted, and like reference numerals are assigned to similar parts throughout the specification.

Throughout the specification, when a part is "connected" to another part, this includes not only "directly connected" but also "electrically connected" with another element in between. In addition, when a part is described to "include" a certain component, this means that other components may be further included rather than excluding other components unless otherwise specified.

Hereinafter, the disclosure will be described in detail with reference to the accompanying drawings.

FIG. 1 is a diagram illustrating an example in which a mobile robot device 1000 provides a service to a user according to some embodiments.

Referring to FIG. 1, a mobile robot device 1000 may provide a service to a user using an arm device. For example, the mobile robot device 1000 may deliver coffee to the user. In addition, by sensing the surrounding environment, the mobile robot device 1000 may change to a safety operation level suitable for the mobile robot device 1000 to travel safely. For example, in case where there is a risk of an accident occurring around the mobile robot device 1000 due to traveling of the mobile robot device 1000, the mobile robot device 1000 may increase the safety operation level.

The safety operation level is a level for controlling an operation related to the movement of the mobile robot device 1000 and the motion of the arm device, and may be expressed as a number, but is not limited thereto.

The mobile robot device 1000 may change the safety operation level by using a trained model trained using an artificial intelligence algorithm. The trained model may correspond to a currently executed service among a plurality of trained models trained for each of a plurality of services provided by the mobile robot device 1000. The mobile robot device 1000 can provide a safer and more efficient robot-traveling environment by controlling the movement of the mobile robot device 1000 and the motion of the arm device so that the dangerous situation can be predicted and avoided in advance through the training of the dangerous situation.

In addition, the mobile robot device 1000 may control the operation of the mobile robot device 1000 based on the changed safety operation level. For example, the mobile robot device 1000 may travel by changing a traveling route or change a moving speed based on the safety operation level.

The mobile robot device 1000 may be a delivery robot, a cleaning robot, a home appliance, and other mobile or non-mobile computing devices. However, the disclosure is not limited thereto, and the mobile robot device 1000 may include all kinds of devices capable of moving and providing services to users.

In addition, the mobile robot device 1000 may communicate with an intermediate server 2000 and other devices (not shown) through a predetermined network in order to change the safety operation level. In this case, the network includes a local area network (LAN), a wide area network (WAN), a value added network (VAN), a mobile radio communication network, a satellite communication network, and the mutual combination thereof, and is a data communication network in a comprehensive sense that enables each network entity to communicate with each other smoothly. In addition, the network may include wired Internet, wireless Internet, and mobile wireless communication networks. Wireless communication is, for example, wireless LAN (Wi-Fi), Bluetooth, Bluetooth low energy, ZigBee, Wi-Fi Direct (WFD), ultra wideband (UWB), infrared data association (IrDA), near field communication (NFC), and the like, but is not limited thereto.

Figure 2:
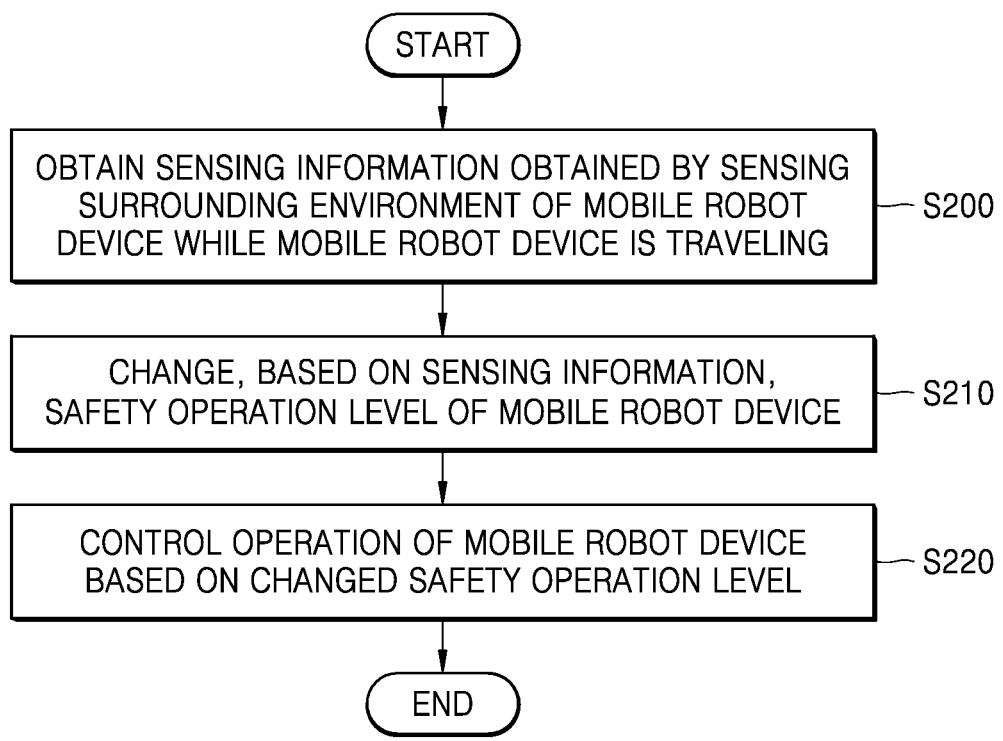
FIG. 2 is a flowchart of a method of providing, by a mobile robot device 1000, a service to a user, according to some embodiments.

FIG. 2 is a flowchart of a method of providing, by a mobile robot device 1000, a service to a user according to some embodiments.

In operation S200, a mobile robot device 1000 may obtain sensing information obtained by sensing the surrounding environment of the mobile robot device 1000 while the mobile robot device 1000 is traveling. For example, the mobile robot device 1000 may sense the surrounding environment in real time while traveling.

In an embodiment, the mobile robot device 1000 may obtain at least one of an image captured around the mobile robot device 1000, or temperature information of a surrounding environment of the mobile robot device 1000. An example in which the mobile robot device 1000 captures images of the surrounding will be described later in FIG. 3.

In operation S210, the mobile robot device 1000 may change, based on sensing information, a safety operation level of the mobile robot device 1000. The mobile robot device 1000 may change the safety operation level by applying the obtained sensing information to a training model trained using an artificial intelligence algorithm. For example, the mobile robot device 1000 is an artificial intelligence algorithm, and may change a safety operation level using a training model trained using at least one of machine learning, neural networks, genes, deep learning, or classification algorithms. For example, the mobile robot device 1000 may change the safety operation level in a direction to enhance safety around the mobile robot device 1000. In addition, when it is determined that there is no dangerous situation around the mobile robot device 1000, the mobile robot device 1000 may optimally provide a service providing operation of the mobile robot device 1000 without changing the safety operation level.

An example in which the mobile robot device 1000 changes the safety operation level based on sensing information according to an embodiment will be described later in FIGS. 4 and 13 to 16.

In operation S220, the mobile robot device 1000 may control the operation of the mobile robot device 1000 based on the changed safety operation level. In an embodiment, the mobile robot device 1000 may control, based on a safety operation level, a moving speed and a moving direction of the mobile robot device 1000, a moving speed and a moving angle of an arm device included in the mobile robot device 1000, a moving noise of the mobile robot device 1000, a notification output of the mobile robot device 1000, and so on. However, it is not limited thereto, and the moving angle of the head portion of the mobile robot device 1000 may be controlled.

An example of controlling, by the mobile robot device 1000, the operation of the mobile robot device 1000 based on the changed safety operation level according to an embodiment will be described later in FIG. 9.

Figure 3:
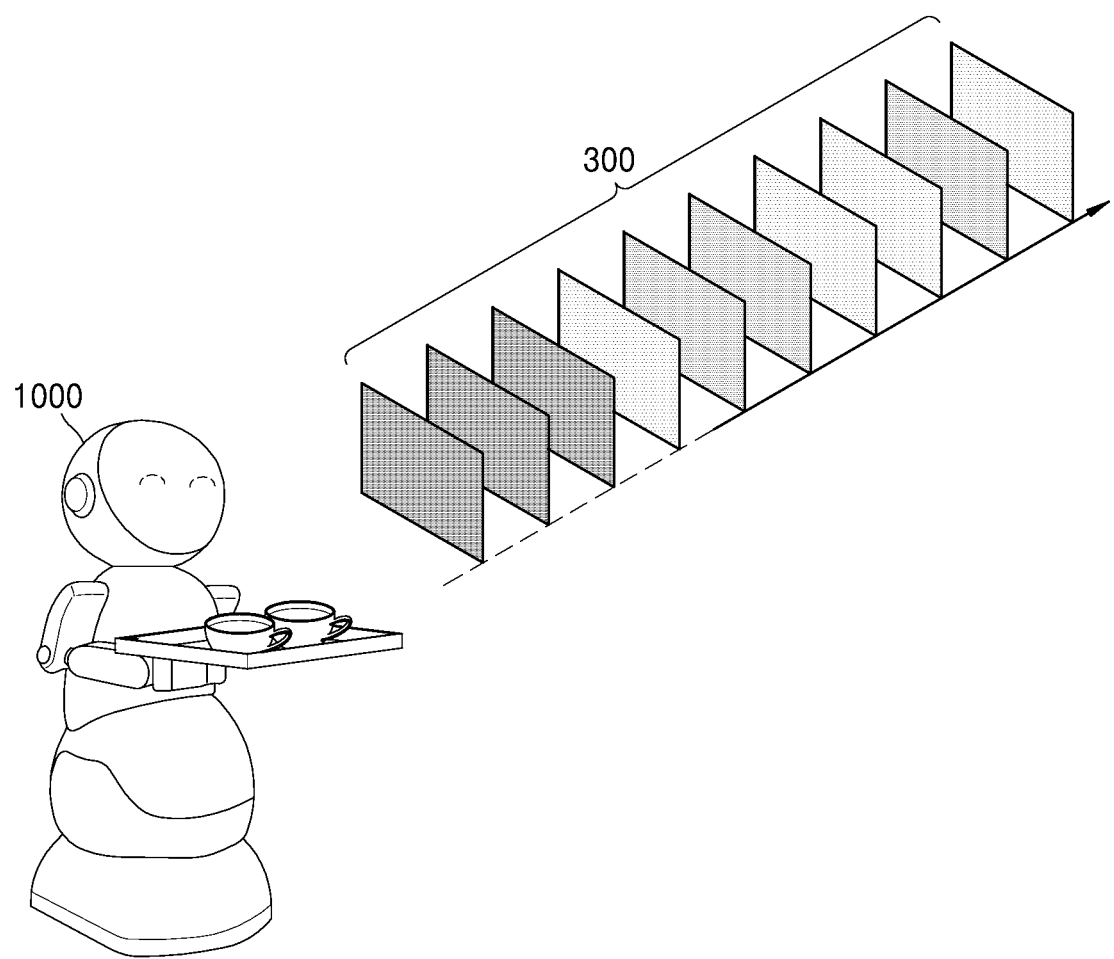
FIG. 3 is a diagram illustrating an example in which a mobile robot device 1000 captures surrounding images, according to some embodiments.

FIG. 3 is a diagram illustrating an example in which a mobile robot device 1000 captures surrounding images according to some embodiments.

Referring to FIG. 3, while the mobile robot device 1000 is traveling, the mobile robot device 1000 may obtain a plurality of images 300 of the surrounding in real time. For example, the mobile robot device 1000 may capture at least one of the front, rear, left, or right sides of the mobile robot device 1000.

In an embodiment, the mobile robot device 1000 may determine in real time whether the surrounding environment is a dangerous situation by obtaining the plurality of images 300. For example, by obtaining a plurality of images 300, the mobile robot device 1000 may identify the movement of an object located nearby.

In an embodiment, the mobile robot device 1000 may store, in a memory, a plurality of images 300 captured while traveling, and when a preset capacity is exceeded, delete image data from old data.

Figure 4:
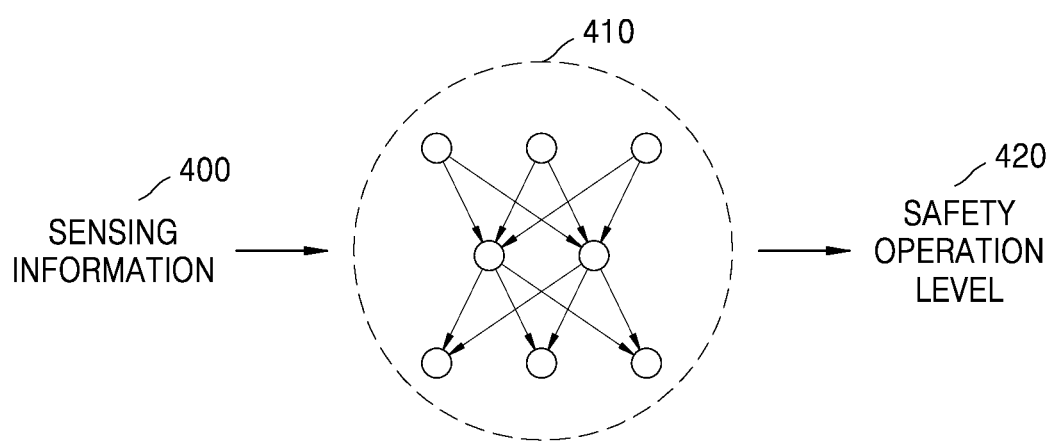
FIG. 4 is a diagram illustrating an example in which a mobile robot device 1000 changes a safety operation level using a single trained model, according to some embodiments.

FIG. 4 is a diagram illustrating an example in which a mobile robot device 1000 changes a safety operation level using a single training model according to some embodiments.

Referring to FIG. 4, the mobile robot device 1000 may apply sensing information 400 that senses the surrounding environment of the mobile robot device 1000 as input data of a training model 410.

The training model 410 may be generated as a result of training criteria for determining a safety operation level based on the sensing information 400. In this case, the training model 410 may be a model pre-built using an artificial intelligence algorithm. For example, the training model 410 may be a pre-built model to receive basic training data (e.g., a sample image) and output a safety operation level 420.

The mobile robot device 1000 may obtain a safety operation level 420 output as a result of inputting the sensing information 400 to the training model 410. The mobile robot device 1000 may change the safety operation level of the mobile robot device 1000 to the safety operation level 420 output from the training model 410. For example, if sensing information 400 that a person with a walking stick is walking, a temperature is high, and a slope of a traveling route is high is input to the training model 410, the safety operation level 420 may be output as 5.

Figure 5:
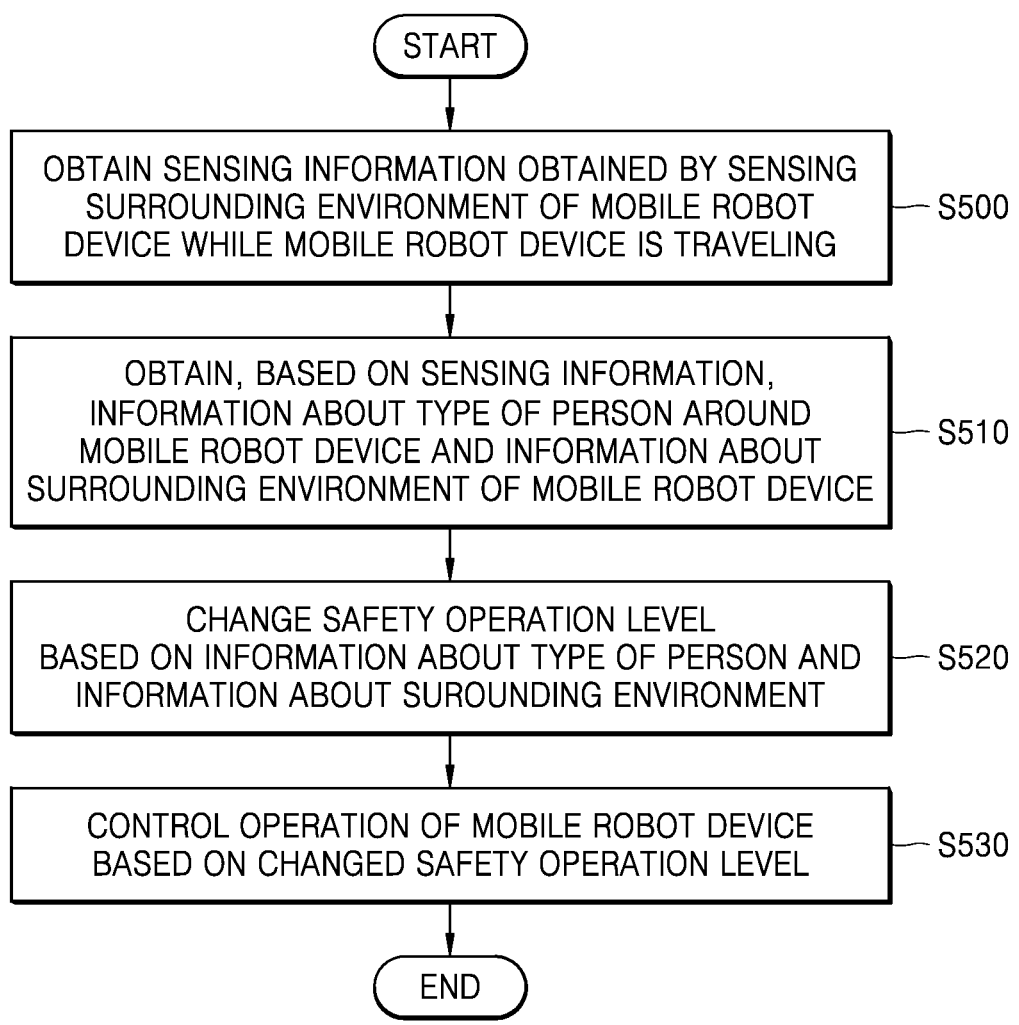
FIG. 5 is a flowchart of a method of controlling an operation of a mobile robot device 1000, according to some embodiments.

FIG. 5 is a flowchart of a method of controlling an operation of a mobile robot device 1000 according to some embodiments.

In operation S500, a mobile robot device 1000 may obtain sensing information obtained by sensing the surrounding environment of the mobile robot device 1000 while the mobile robot device 1000 is traveling.

Because operation S500 corresponds to operation S200 of FIG. 2, a detailed description will be omitted.

In operation S510, the mobile robot device 1000 may obtain, based on sensing information, information about a type of person around the mobile robot device 1000 and information about a surrounding environment of the mobile robot device 1000.

The mobile robot device 1000 may obtain information about a person type and information about a surrounding environment by applying the obtained sensing information to a training model trained using an artificial intelligence algorithm. For example, the mobile robot device 1000 is an artificial intelligence algorithm, and may obtain information about a person's type and information about a surrounding environment using a training model trained using at least one of machine learning, neural networks, genes, deep learning, or classification algorithms.

In FIG. 4, it has been described that a safety operation level is output by inputting sensing information to a single training model, but is not limited thereto. For example, the safety operation level may be changed from sensing information using a plurality of training models as described later in FIG. 6. In this case, by inputting sensing information in a training model for obtaining information about the type of person and information about the surrounding environment, information about the type of person and information about the surrounding environment may be output.

An example in which the mobile robot device 1000 obtains, based on sensing information, information about the type of person and information about the surrounding environment according to an embodiment will be described later in FIG. 6.

In operation S520, the mobile robot device 1000 may change the safety operation level of the mobile robot device 1000 based on information on the type of person and information on the surrounding environment.

The mobile robot device 1000 may change the safety operation level by applying the obtained information about the type of person obtained and the obtained information on the surrounding environment to the training model trained using the artificial intelligence algorithm. For example, the mobile robot device 1000 is an artificial intelligence algorithm, and may change the safety operation level using a training model trained using at least one of machine learning, neural networks, genes, deep learning, or classification algorithms.

In FIG. 4, it has been described that a safety operation level is output by inputting sensing information to a single training model, but is not limited thereto. For example, the safety operation level may be changed from sensing information using a plurality of training models as described later in FIG. 6. In this case, a safety operation level may be output by inputting information about a person type and/or information about a surrounding environment to a training model for determining a safety operation level.

In an embodiment, when the information about the type of person around the mobile robot device 1000 indicates an infant, the mobile robot device 1000 may be controlled to reduce the moving speed of the mobile robot device 1000 and not change the angle of the arm device.

In an embodiment, when the information about the type of person around the mobile robot device 1000 indicates a disabled person, the mobile robot device 1000 may be controlled to reduce the moving speed of the mobile robot device 1000 and increase the moving noise of the mobile robot device 1000.

In an embodiment, when the information about the surrounding environment of the mobile robot device 1000 indicates that the congestion around the mobile robot device 1000 is high, the mobile robot device 1000 may be controlled to reduce the moving speed of the mobile robot device 1000 and change the moving direction of the mobile robot device 1000.

In an embodiment, when information about the surrounding environment of the mobile robot device 1000 indicates that the slope of the traveling route of the mobile robot device 1000 is high, the mobile robot device 1000 may be controlled to reduce the moving speed of the mobile robot device 1000. In addition, the mobile robot device 1000 may control the operation of the mobile robot device 1000 in consideration of the material of the floor of the traveling route as well as the slope of the traveling route.

In an embodiment, when the information about the surrounding environment of the mobile robot device 1000 indicates that the risk of an object located around the mobile robot device 1000 is high, the mobile robot device 1000 may reduce the moving speed of the mobile robot device 1000 and change the moving direction of the mobile robot device 1000.

An example in which the mobile robot device 1000 changes a safety operation level based on the information about the type of person and the information about the surrounding environment according to an embodiment will be described later in FIG. 6.

In operation S530, the mobile robot device 1000 may control the operation of the mobile robot device 1000 based on the changed safety operation level.

Because operation S530 corresponds to operation S220 of FIG. 2, a detailed description will be omitted.

Figure 6:
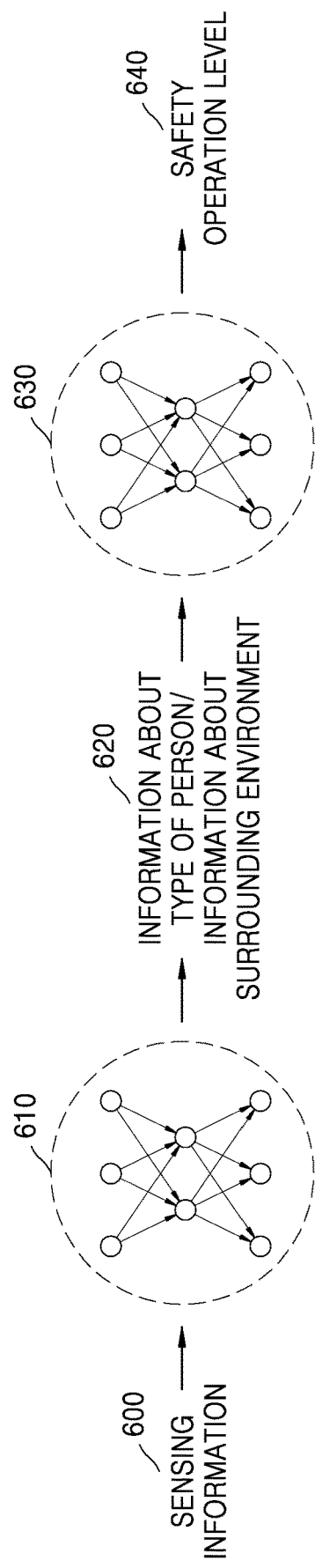
FIG. 6 is a diagram illustrating an example in which a mobile robot device 1000 changes a safety operation level using a plurality of trained models, according to some embodiments.

FIG. 6 is a diagram illustrating an example in which a mobile robot device 1000 changes a safety operation level using a plurality of training models according to some embodiments.

Referring to FIG. 6, unlike the single training model used in FIG. 4, the mobile robot device 1000 may change a safety operation level using a plurality of training models 610 and 630.

In an embodiment, the mobile robot device 1000 may apply sensing information 600 for which the surrounding environment of the mobile robot device 1000 is sensed, as input data of a training model 610 for obtaining information about the type of person and information about the surrounding environment 620.

The training model 610 to obtain information about the type of person and information about the surrounding environment 620 may be generated as a result of training, based on the sensing information 600, the criteria for obtaining information about the type of person and information about the surrounding environment 620. In this case, the training model 610 may be a model pre-built using an artificial intelligence algorithm. For example, the training model 610 may be a pre-built model for receiving basic training data (e.g., a sample image) and outputting information about the type of person and information about the surrounding environment 620.

The mobile robot device 1000 may obtain information about the type of person and information about the surrounding environment 620 output as a result of inputting sensing information 600 to the training model 610. For example, the mobile robot device 1000 may output, from the training model 610, only information about the type of person or only information about the surrounding environment, and may output both information about the type of person and information about the environment.

In an embodiment, the mobile robot device 1000 may apply the information about the type of person and information about the surrounding environment 620 output from the training model 610 as input data of a training model 630 for determining a safety operation level 640. For example, the mobile robot device 1000 may input, to the training model 630, only information about the type of person or only information about the surrounding environment, and may input both information about the type of person and information about the environment.

The training model 630 for determining the safety operation level 640 may be generated as a result of training the criteria for determining the safety operation level 640 based on the information about the type of person and the information about the surrounding environment 620. In this case, the training model 630 may be a model pre-built using an artificial intelligence algorithm. For example, the training model 630 is a model that is pre-built to receive basic training data (for example, information that an infant is located nearby and information that a slope of a traveling route is high), and output a safety operation level 640.

The mobile robot device 1000 may obtain a safety operation level 640 output as a result of inputting the information about the type of person and the information about the surrounding environment 620 to the training model 610. The mobile robot device 1000 may change the safety operation level of the mobile robot device 1000 to the safety operation level 640 output from the training model 630.

For example, when sensing information that a person with a walking stick is walking around and the temperature is high is input to the training model 610, information about the type of person that a visually impaired person is moving nearby and information about the surrounding environment that congestion is high nearby 620 may be output. In addition, for example, when information about the type of person that a visually impaired person is moving nearby and information about the surrounding environment that congestion is high nearby 620 are input to the training model 630, the safety operation level 420 may be output as 5.

Figure 7:
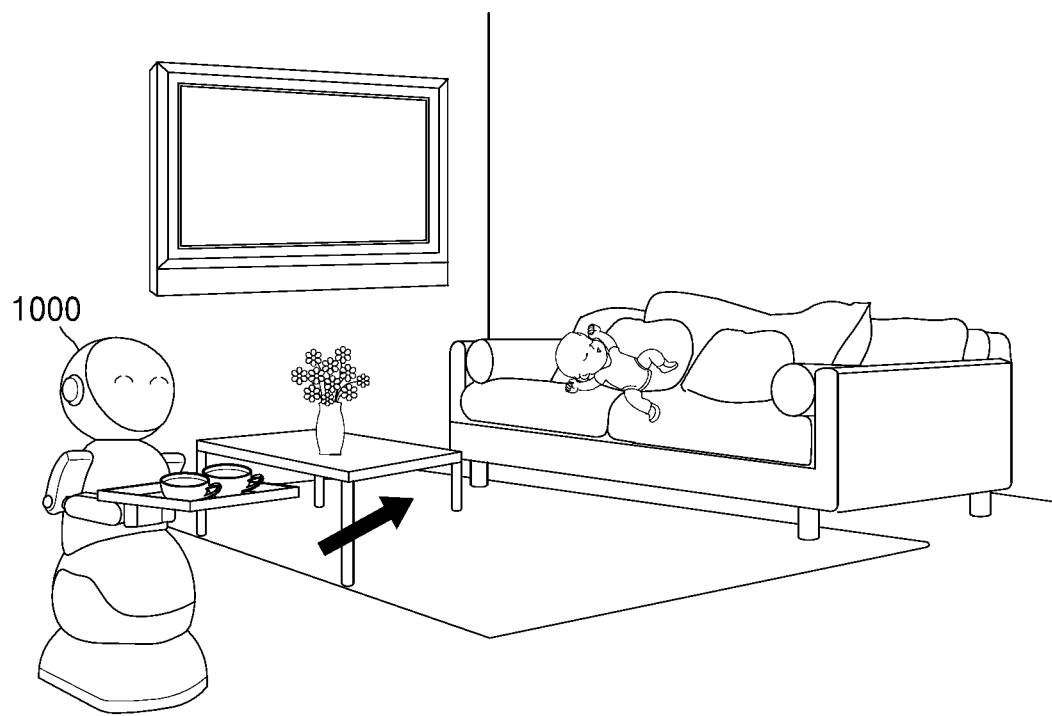
FIG. 7 is a diagram illustrating an example in which a mobile robot device 1000 controls the operation of the mobile robot device 1000 based on information about a type of person, according to some embodiments.

FIG. 7 is a diagram illustrating an example in which a mobile robot device 1000 controls the operation of the mobile robot device 1000 based on information about a person type according to some embodiments.

Referring to FIG. 7, a mobile robot device 1000 may control the operation of the mobile robot device 1000 based on information about the type of person obtained through sensing information. For example, an image of the front of the mobile robot device 1000 captured while the mobile robot device 1000 is traveling may include an infant. Accordingly, when information about the type of person around the mobile robot device 1000 indicates an infant, the moving speed of the mobile robot device 1000 may be reduced. In addition, the movement of the mobile robot device 1000 may be stopped. Moreover, it may be controlled such that the angle of an arm device remains unchanged. Further, it may also be controlled such that the angle of the arm device is not automatically changed, but is changed only by a user input. Alternatively, the angle of the arm device may be controlled to change by only 20 degrees, but is not limited thereto. For example, the mobile robot device 1000 may be controlled to a preset operation according to a safety operation level. Alternatively, for example, the operation of the mobile robot device 1000 may be controlled according to information about the type of person based on training according to preset criteria without changing the safety operation level.

Figure 8:
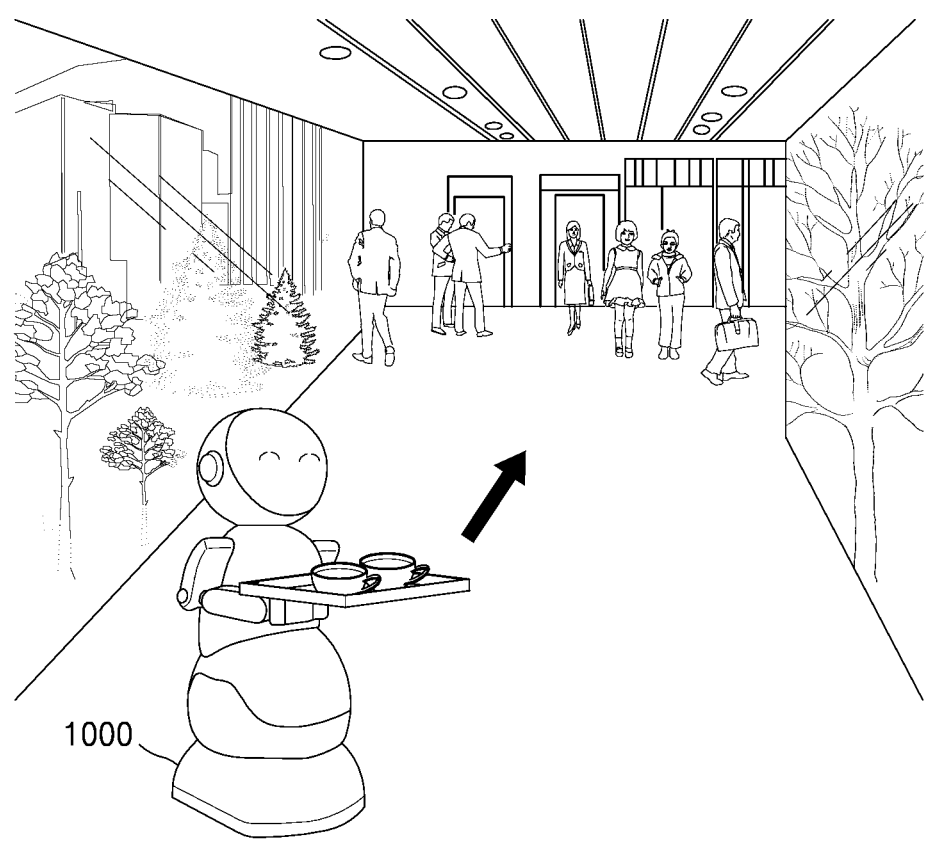
FIG. 8 is a diagram illustrating an example in which a mobile robot device 1000 controls the operation of the mobile robot device 1000 based on information about the surrounding environment, according to some embodiments.

FIG. 8 is a diagram illustrating an example in which a mobile robot device 1000 controls the operation of the mobile robot device 1000 based on information about the surrounding environment according to some embodiments.

Referring to FIG. 8, a mobile robot device 1000 may control the operation of the mobile robot device 1000 based on information about the surrounding environment obtained through sensing information. For example, an image of the surroundings captured while the mobile robot device 1000 traveling may include a glass wall. Accordingly, when information about the surrounding environment around the mobile robot device 1000 indicates that the wall material is glass, the moving speed of the mobile robot device 1000 may be reduced. In addition, the movement of the mobile robot device 1000 may be stopped. In addition, when the mobile robot device 1000 is traveling to approach the wall, it may be controlled such that the moving direction is changed. For example, the mobile robot device 1000 may be controlled to a preset operation according to a safety operation level. Alternatively, for example, the operation of the mobile robot device 1000 may be controlled according to information about the surrounding environment based on training according to preset criteria without changing the safety operation level.

FIG. 9 is a diagram illustrating a table showing an example of an operation of a mobile robot device according to a safety operation level according to some embodiments.

Referring to FIG. 9, Table 900 may include a safety operation level field, a moving speed field, a moving direction field, an arm speed field, an arm angle field, a moving noise field, and a notification field.

In the safety operation level field, a level for controlling the movement of the mobile robot device 1000, the motion of the arm device, and an operation related to an increase in the safety may be recorded. For example, 1, 2, 3, 4, and N (for example, N is a natural number) may be recorded in the safety operation level field, but it is not limited thereto.

The moving speed field, the moving direction field, the arm speed field, the arm angle field, the moving noise field, and the notification field may include detailed operations of the mobile robot device 1000 corresponding to a specific safety operation level. For example, when the safety operation level is 1, the moving speed of the mobile robot device 1000 may be 48 m/min, the moving direction may be the front, the moving speed of the arm device may be 5 cm/sec, the angle of the arm device may be 90 degrees, and the moving noise of the mobile robot device 1000 may be K dB (for example, K is an integer), and the notification method may be a display, but is not limited thereto. The operation of the mobile robot device 1000 corresponding to the safety operation level may be set and changed based on training according to preset criteria.

Figure 10:
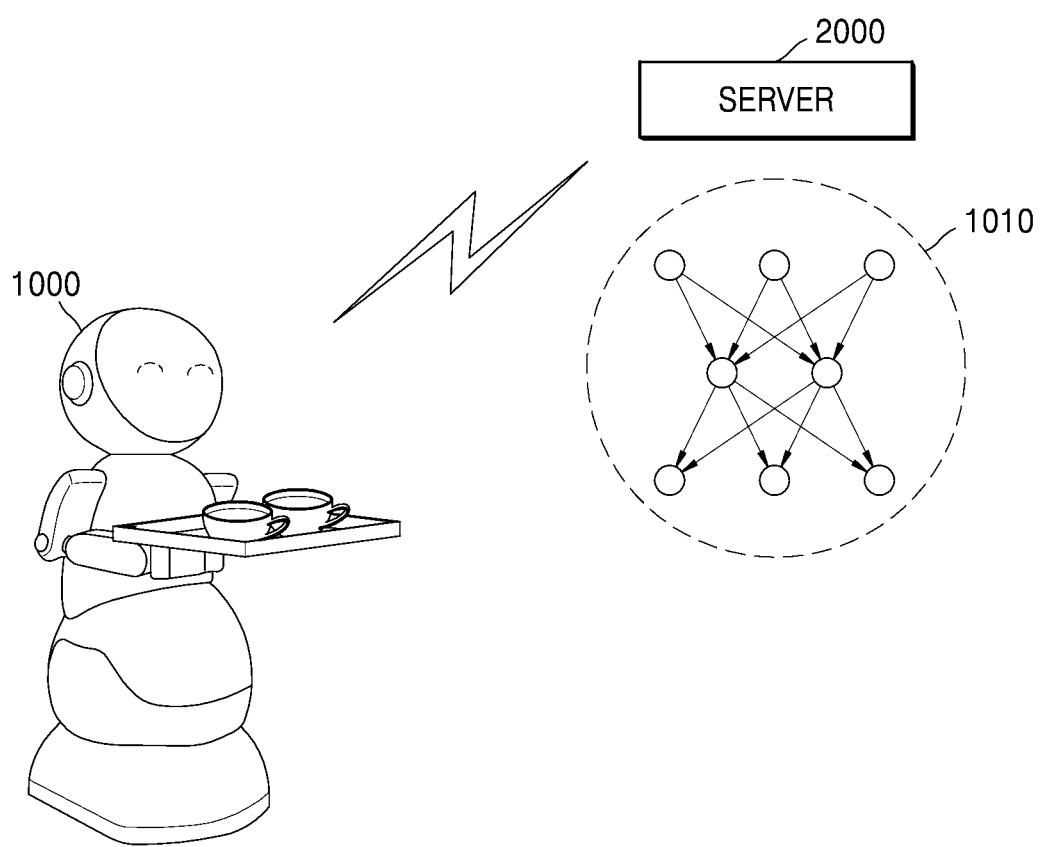
FIG. 10 is a diagram illustrating an example in which a mobile robot device 1000 provides a service to a user by interworking with a server 2000, according to some embodiments.

FIG. 10 is a diagram illustrating an example in which a mobile robot device 1000 provides a service to a user by interworking with a server 2000 according to some embodiments.

Referring to FIG. 10, a mobile robot device 1000 may be connected to a server 2000 through a network, and may provide a service to a user using data trained according to criteria preset by the server 2000.

In this case, the server 2000 may perform at least one of a function of determining whether the vicinity of the mobile robot device 1000 is a dangerous situation, a function of obtaining information about the type of people around the mobile robot device 1000 and information about the surrounding environment of the mobile robot device 1000, or a function of changing a safety operation level, performed by the mobile robot device 1000 in FIGS. 1 to 9.

In this case, the mobile robot device 1000 and the server 2000 may transmit and receive data necessary for each other in order to perform their own functions. For example, the mobile robot device 1000 may provide data required for a predetermined function performed by the server 2000 to the server 2000, and the mobile robot device 1000 may receive result data generated according to a function performed by the server 2000 from the server 2000. In addition, the server 2000 may provide data required for a predetermined function performed by the mobile robot device 1000 to the device 1000, and the server 2000 may receive result data generated according to a function performed by the mobile robot device 1000 from the mobile robot device 1000.

In addition, the server 2000 may manage at least one of data necessary to determine whether the surroundings of the mobile robot device 1000 are in a dangerous situation, data necessary to obtain information about the type of person around the mobile robot device 1000 and information about the surrounding environment of the mobile robot device 1000, or data necessary to change a safety operation level.

Figure 11:
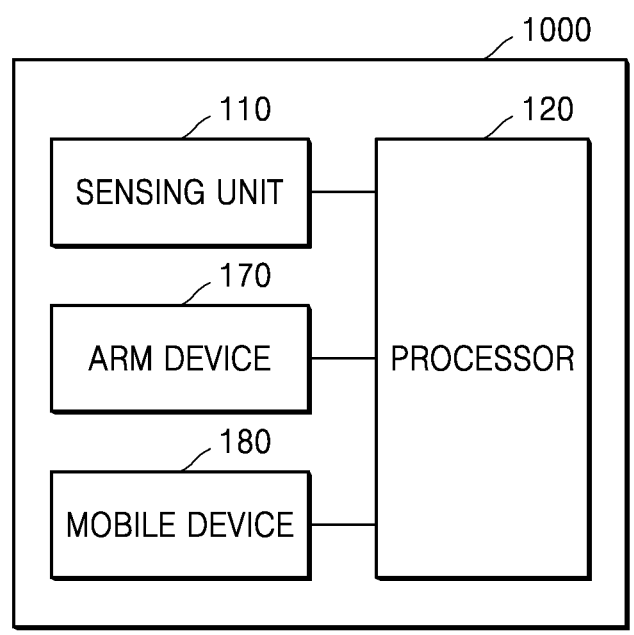
FIGS. 11 and 12 are block diagrams of a mobile robot device 1000 according to some embodiments.
Figure 12:
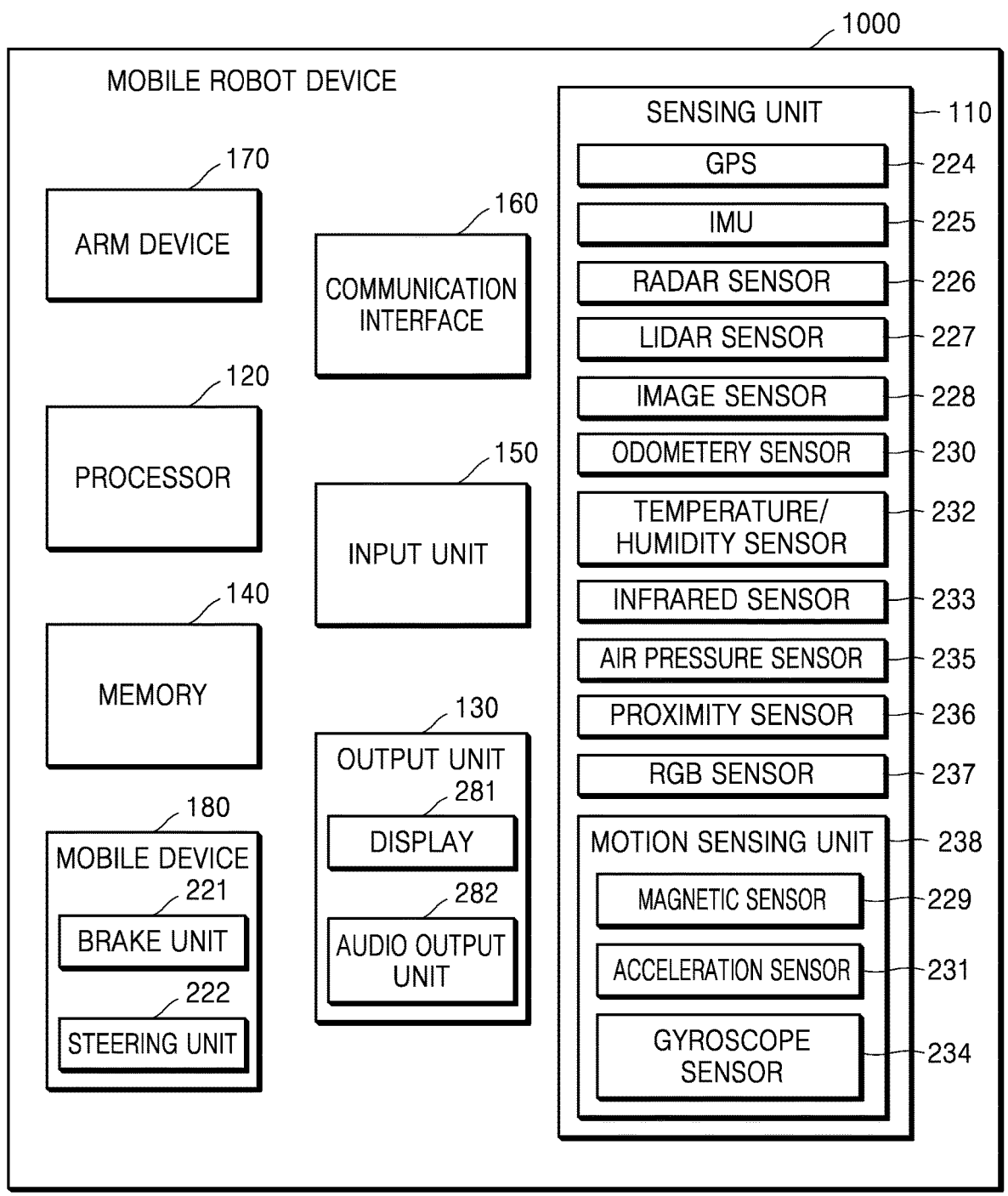

FIGS. 11 and 12 are block diagrams of a mobile robot device 1000 according to some embodiments.

As illustrated in FIG. 11, a mobile robot device 1000 according to some embodiments may include a sensing unit 110, a processor 120, an arm device 170, and a mobile device 180. However, not all of the components shown in FIG. 11 are essential components of the mobile robot device 1000. The mobile robot device 1000 may be implemented by more components than those illustrated in FIG. 11, or the mobile robot device 1000 may be implemented by fewer components than those illustrated in FIG. 11.

For example, as illustrated in FIG. 12, the mobile robot device 1000 according to some embodiments may further include an output unit 130, a memory 140, an input unit 150, and a communication interface 160 in addition to the sensing unit 110, the processor 120, the arm device 170, and mobile device 180.

According to an embodiment, the sensing unit 110 may obtain sensing information obtained by sensing the surrounding environment of the mobile robot device 1000 while the mobile robot device 1000 is traveling. For example, the sensing unit 110 may obtain at least one of an image captured around the mobile robot device 1000 or temperature information of the surrounding environment. In addition, while the mobile robot device 1000 is traveling, the sensing unit 110 may obtain location information of the mobile robot device 1000.

The sensing unit 110 may include a plurality of sensors configured to sense the surrounding environment of the mobile robot device 1000. For example, sensing unit 110 may include an image sensor 228, such as a camera, to capture an image of the surroundings of the mobile robot device 1000. In addition, the sensing unit 110 may include a temperature/humidity sensor 232 to obtain temperature information and/or humidity information of the surrounding environment of the mobile robot device 1000.

Further, the sensing unit 110 may include sensors for obtaining location information of the mobile robot device 1000. For example, the sensor 110 may include distance sensors, such as an RADAR sensor 226, a LIDAR sensor 227, and an odometery sensor 230.

In addition, the sensor 110 may include one or more actuators configured to correct the position and/or orientation of a plurality of sensors, so that images of the direction of each of the front, rear, and sides of the mobile robot device 1000 may be captured.

The sensor 110 may include a plurality of sensors configured to sense information about the surrounding environment in which the mobile robot device 1000 is located, and may include one or more actuators configured to modify the position and/or orientation of the sensors. For example, the sensing unit 110 may include a global positioning system (GPS) 224, an inertial measurement unit (IMU) 225, an RADAR sensor 226, a LIDAR sensor 227, an image sensor 228, and an odometery sensor 230. Further, the sensing unit 110 may include at least one of a temperature/humidity sensor 232, an infrared sensor 233, an air pressure sensor 235, a proximity sensor 236, or an RGB sensor (illuminance sensor) 237, but is not limited thereto. Because the function of each sensor can be intuitively deduced, by a person skilled in the art from the name, a detailed description will be omitted.

In addition, the sensing unit 110 may include a motion sensing unit 238 capable of sensing the motion of the mobile robot device 1000. The motion sensing unit 238 may include a magnetic sensor 229, an acceleration sensor 231, and a gyroscope sensor 234.

The GPS 224 may be a sensor configured to estimate the geographic location of the mobile robot device 1000. That is, the GPS 224 may include a transceiver configured to estimate the location of the mobile robot device 1000 relative to the Earth.

The IMU 225 may be a combination of sensors configured to sense changes in position and orientation of the mobile robot device 1000 based on inertial acceleration. For example, a combination of sensors may include accelerometers and gyroscopes.

The RADAR sensor 226 may be a sensor configured to detect objects in an environment where the mobile robot device 1000 is located using a wireless signal. Further, the RADAR sensor 226 may be configured to detect the speed and/or direction of objects.

The LIDAR sensor 227 may be a sensor configured to detect objects in an environment where the mobile robot device 1000 is located using a laser. More specifically, the LIDAR sensor 227 may include a laser light source configured to emit a laser and/or a laser scanner, and a detector configured to detect reflection of a laser. The LIDAR sensor 227 may be configured to operate in a coherent (e.g., using heterodyne detection) or incoherent detection mode.

The image sensor 228 may be a still camera or a video camera configured to record the environment outside the mobile robot device 1000. For example, the image sensor 228 may include a plurality of cameras, and the plurality of cameras may be positioned at a plurality of locations on mobile robot device 1000, respectively.

The odometery sensor 230 may estimate the location of the mobile robot device 1000 and measure the moving distance. For example, the odometery sensor 230 may measure a position change value of the mobile robot device 1000 using the number of rotations of a wheel of the mobile robot device 1000.

The input unit 150 means a means for inputting data for controlling the mobile robot device 1000. For example, the input unit 150 may include a key pad, a dome switch, a touch pad (contact capacitive type, pressure resistive film type, infrared detect type, surface ultrasonic conduction type, integral tension measurement type, piezo effect type, and so on), a jog wheel, a jog switch, and the like, but is not limited thereto. Further, the input unit 150 may include a microphone, and the microphone may be configured to receive audio (e.g., a voice command) from a user.

The output unit 130 may output an audio signal or a video signal, and the output unit 130 may include a display 281 and an audio output unit 282.

The display 281 may display and output information processed by the mobile robot device 1000. For example, the display 281 may display a notification message informing a dangerous situation to a person located around the mobile robot device 1000 while the mobile robot device 1000 is traveling. In addition, the display 281 may display a user interface for performing an action related to a notification.

The display 281 may include at least one of a liquid crystal display, a thin film transistor-liquid crystal display, an organic light-emitting diode, a flexible display, a 3D display, or an electrophoretic display. Depending on the implementation form of the output unit 130, the output unit 130 may include two or more displays 281.

The audio output unit 282 outputs audio data received from the communication interface 160 or stored in the memory 140. For example, the audio output unit 282 may output a notification message informing a dangerous situation to a person located around the mobile robot device 1000 as a sound while the mobile robot device 1000 is traveling. Further, the audio output unit 282 may include a speaker, a buzzer, and the like.

The input unit 150 and the output unit 130 may include a network interface, and may be implemented as a touch screen.

The communication interface 160 may include at least one antenna for wireless communication with other devices. For example, the communication interface 160 may be used to wirelessly communicate with a cellular network or other wireless protocols and systems via Wi-Fi or Bluetooth. The communication interface 160 controlled by the processor 120 may transmit and receive wireless signals. For example, the processor 120 may execute a program included in the memory 140 in order for the communication interface 160 to transmit and receive wireless signals to and from a cellular network.

The processor 120 generally controls the overall operation of the mobile robot device 1000. For example, the processor 120 may overall control the sensing unit 110, the output unit 130, the input unit 150, the communication interface 160, the arm device 170, and the mobile device 180 by executing programs stored in the memory 140. Further, the processor 120 may perform the functions of the mobile robot device 1000 described in FIGS. 1 to 10 by executing programs stored in the memory 140.

Specifically, the processor 120 may obtain, through the sensing unit 110, sensing information obtained by sensing the surrounding environment of the mobile robot device 1000. For example, the sensing information may include at least one of an image captured around the mobile robot device 1000 or temperature information of the surrounding environment.

In an embodiment, the processor 120 may change a safety operation level of the mobile robot device 1000 by applying sensing information to a training model trained using an artificial intelligence algorithm. In addition, the processor 120 may control the operation of the mobile robot device 1000 based on a safety operation level.

In an embodiment, when the information about the type of person around the mobile robot device 1000 indicates an infant, the processor 120 may control such that the moving speed of the mobile robot device 1000 is reduced and that the angle of the arm device remains unchanged.

In an embodiment, when the information about the type of person around the mobile robot device 1000 indicates a disabled person, the processor 120 may control such that the moving speed of the mobile robot device 1000 is reduced and that the moving noise of the mobile robot device 1000 is increased.

In an embodiment, when the information about the surrounding environment of the mobile robot device 1000 indicates that the congestion around the mobile robot device 1000 is high, the processor 120 may control such that the moving speed of the mobile robot device 1000 is reduced and that the moving direction of the mobile robot device 1000 is changed.

In an embodiment, when information about the surrounding environment of the mobile robot device 1000 indicates that the slope of the traveling route of the mobile robot device 1000 is high, the processor 120 may control such that the moving speed of the mobile robot device 1000 is reduced. In addition, the mobile robot device 1000 may control the operation of the mobile robot device 1000 in consideration of the material of the floor of the traveling route as well as the slope of the traveling route.

In an embodiment, when the information about the surrounding environment of the mobile robot device 1000 indicates that the risk of an object located near the mobile robot device 1000 is high, the processor 120 may reduce the moving speed of the mobile robot device 1000 and change the moving direction of the mobile robot device 1000.

The memory 140 may store a program for processing and controlling the processor 120, and may store data input to or output from the mobile robot device 1000.

The memory 140 may include at least one type of storage medium from among a flash memory type, a hard disk type, a multimedia card micro type, a card type memory (for example, SD or XD memory, and the like), random access memory (RAM), static random access memory (SRAM), read-only memory (ROM), electrically erasable programmable read-only memory (EEPROM), programmable read-only memory (PROM), magnetic memory, magnetic disk, or optical disk. For example, the memory 140 may store an image of the surroundings of the mobile robot device 1000 captured while the mobile robot device 100 is traveling.

Programs stored in the memory 140 may be classified into a plurality of modules according to their functions, for example, may include a notification module.

The notification module may be configured to output a notification signal in the form of a video signal through the display unit 281, or to output a notification signal in the form of an audio signal through the audio output unit 282, or a notification signal in the form of a vibration signal through a vibration motor.

The arm device 170 is an arm portion of the mobile robot device 1000, and the moving speed, angle, and direction, etc. of the arm device 170 may be controlled by the processor 120. In addition, a head device (not shown) is a head portion of the mobile robot device 1000, and the moving angle, direction, etc. of the head device (not shown) may be controlled by the processor 120.

The mobile device 180 may include a brake unit 221, a steering unit 222, and a throttle 223.

The steering unit 222 may be a combination of mechanisms configured to adjust the direction of the mobile robot device 1000.

The brake unit 221 may be a combination of mechanisms configured to decelerate the mobile robot device 1000. For example, the brake unit 221 may use friction to reduce the speed of a wheel of the mobile robot device 1000.

Figure 13:
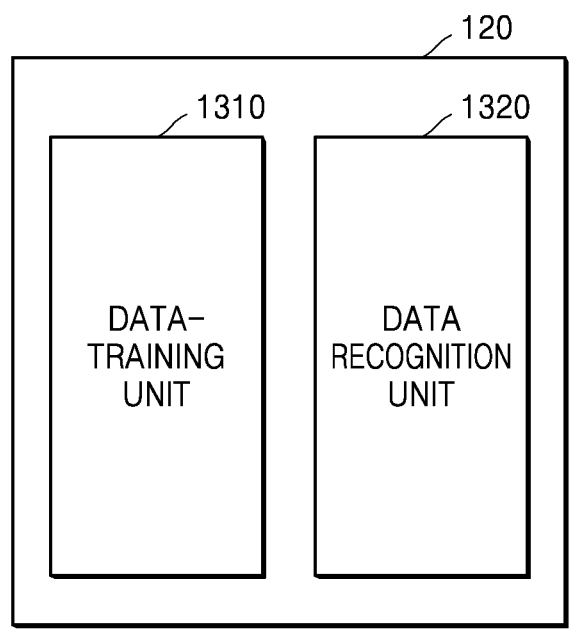
FIG. 13 is a block diagram of a processor 1300 according to some embodiments.

FIG. 13 is a block diagram of a processor 1300 according to some embodiments.

Referring to FIG. 13, a processor 120 according to some embodiments may include a data-training unit 1310 and a data recognition unit 1320.

The training model described above in FIGS. 1 to 12 may be referred to as a data recognition model in FIGS. 13 to 16.

The data-training unit 1310 may be configured to train criteria for changing a safety operation level of the mobile robot device 1000. The data-training unit 1310 may be configured to train criteria for determining what data is to be used to determine a situation for changing a predetermined safety operation level, and how to determine a situation using the data. The data-training unit 1310 may be configured to obtain data to be used for training, and apply the obtained data to a data recognition model to be described later, thereby training criteria for changing a safety operation level.

The data recognition unit 1320 may be configured to determine whether to change a safety operation level based on the data. The data recognition unit 1320 may be configured to recognize, whether to change the safety operation level from predetermined data by using the trained data recognition model. The data recognition unit 1320 may obtain preset data according to preset criteria by training, and use a data recognition model using the obtained data as an input value to thereby determine whether to change a safety operation level based on the preset data. In addition, a result value output by the data recognition model using the obtained data as an input value may be used to update the data recognition model.

At least one of the data-training unit 1310 or the data recognition unit 1320 may be manufactured in the form of at least one hardware chip and mounted on an electronic device. For example, at least one of the data-training unit 1310 or the data recognition unit 1320 may be manufactured in the form of a dedicated hardware chip for artificial intelligence (AI), or an existing general-purpose processor (for example, a CPU or an application processor), or may be manufactured as part of a graphic-only processor (e.g., a GPU) and mounted on various electronic devices described above.

In this case, the data-training unit 1310 and the data recognition unit 1320 may be mounted on one electronic device, or may be mounted on separate electronic devices, respectively. For example, one of the data-training unit 1310 and the data recognition unit 1320 may be included in the mobile robot device 1000, and the other one may be included in the server 2000. In addition, the data-training unit 1310 and the data recognition unit 1320 may provide model information constructed by the data-training unit 1310 to the data recognition unit 1320 through wired or wireless communication, and the data input to the data recognition unit 1320 may be provided to the data-training unit 1310 as additional training data.

Meanwhile, at least one of the data-training unit 1310 or the data recognition unit 1320 may be implemented as a software module. When at least one of the data-training unit 1310 or the data recognition unit 1320 is implemented as a software module (or a program module including an instruction), the software module may be stored in non-transitory computer-readable media. In addition, in this case, at least one software module may be provided by an operating system (OS) or may be provided by a predetermined application. Alternatively, some of at least one software module may be provided by an operating system (OS), and the other may be provided by a predetermined application.

Figure 14:
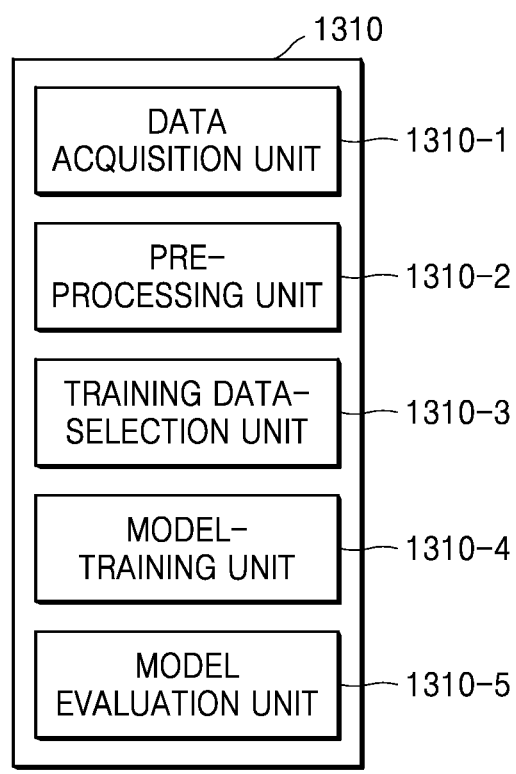
FIG. 14 is a block diagram of a data-training unit 1310 according to some embodiments.

FIG. 14 is a block diagram of a data-training unit 1310 according to some embodiments.

Referring to FIG. 14, a data-training unit 1310 according to some embodiments may include a data acquisition unit 1310-1, a pre-processing unit 1310-2, a training data-selection unit 1310-3, and a model-training unit 1310-4, and a model evaluation unit 1310-5.

The data acquisition unit 1310-1 may be configured to obtain data necessary to determine whether to change a safety operation level. The data acquisition unit 1310-1 may be configured to obtain data necessary for training to determine whether to change a safety operation level.

According to an embodiment, the data acquisition unit 1310-1 may be configured to obtain sensing information obtained by sensing the surrounding environment when the mobile robot device 1000 is traveling. For example, the data acquisition unit 1310-1 may be configured to receive an image captured around in real time when the mobile robot device 1000 is traveling. In addition, the data acquisition unit 1310-1 may be configured to receive data through an input device (e.g., microphone, camera or sensor) of the mobile robot device 1000. Alternatively, the data acquisition unit 1310-1 may be configured to obtain data through an external device communicating with the mobile robot device 1000.

According to an embodiment, an image captured around may be more than one, and may be a video including a plurality of images. For example, the data acquisition unit 1310-1 may be configured to receive a video through a camera of a mobile robot device 1000 including a data-training unit 1310, or an external camera (e.g., CCTV, etc.) capable of communicating with a mobile robot device 1000 including a data-training unit 1310.

A camera may include one or more image sensors (e.g., front sensor or rear sensor), a lens, an image signal processor (ISP), or a flash (e.g., LED or xenon lamp, etc.).

The pre-processing unit 1310-2 may be configured to preprocess obtained data so that the obtained data may be used for training to change a safety operation level. The pre-processing unit 1310-2 may be configured to process obtained data in a preset format so that the model-training unit 1310-4, which will be described later, may use the obtained data for training to change a safety operation level. For example, the pre-processing unit 1310-2 may be configured to, based on a common region included in each of a plurality of images (or frames) constituting at least a portion of an input video, overlap at least a portion of the plurality of images and generate a single composite image. In this case, a plurality of composite images may be generated from one video. The common region may be a region that includes the same or similar common object (e.g., an object, a plant or animal, or a person) in each of the plurality of images. Alternatively, the common region may be a region in which colors, shades, RGB values, or CMYK values are the same or similar in each of the plurality of images.

The training data-selection unit 1310-3 may be configured to select data necessary for training from pre-processed data. The selected data may be provided to the model-training unit 1310-4. The training data-selection unit 1310-3 may be configured to select, according to preset criteria for situation determination, data necessary for training from the pre-processed data. In addition, the training data-selection unit 1310-3 may also be configured to select data according to preset criteria by training by the model-training unit 1310-4, which will be described later.

For example, data regarding objects, structures, etc. that may have a dangerous effect on the surroundings of the mobile robot device 1000 may be selected.

The model-training unit 1310-4 may be configured to train a criteria for how to change a safety operation level based on training data. In addition, the model-training unit 1310-4 may also be configured to train criteria on what training data to use for changing a safety operation level.

According to an embodiment, the model-training unit 1310-4 may be configured to train, based on sensing information, criteria for changing to which safety operation level.

In addition, the model-training unit 1310-4 may configured to train a data recognition model used to change a safety operation level using training data. In this case, the data recognition model may be a pre-built model. For example, the data recognition model may be a model pre-built by receiving basic training data (e.g., sample images, etc.).

The data recognition model may be constructed in consideration of application fields of the recognition model, training purpose, or computer performance of the device. The data recognition model may be, for example, a model based on a neural network. For example, a model such as a deep neural network (DNN), a recurrent neural network (RNN), or a bidirectional recurrent deep neural network (BRDNN) may be used as a data recognition model, but it is not limited thereto.

According to various embodiments, when there are a plurality of pre-built data recognition models, the model-training unit 1310-4 may be configured to determine a data recognition model of a high relationship between input training data and basic training data as a data recognition model to be trained. In this case, the basic training data may be pre-classified for each type of data, and the data recognition model may be pre-built for each type of data. For example, the basic training data may be pre-classified based on various criteria such as the region where the training data was generated, the time when the training data was generated, the size of the training data, the genre of the training data, the generator of the training data, and the type of object in the training data, and the like.

In addition, the model-training unit 1310-4 may be configured to train a data recognition model using, for example, a training algorithm including error back-propagation or gradient descent.

In addition, the model-training unit 1310-4 may, for example, train a data recognition model through supervised learning using training data as an input value. In addition, the model-training unit 1310-4, for example, may be configured to train the data recognition model through unsupervised learning that discover criteria for changing a safety operation level by self-training a type of data necessary to change a safety operation level without much supervision. In addition, the model-training unit 1310-4 may be configured to train a data recognition model, for example, through reinforcement learning using feedback on whether a result of a safety operation level change according to training is correct.

In addition, when a data recognition model is trained, the model-training unit 1310-4 may be configured to store the trained data recognition model. In this case, the model-training unit 1310-4 may be configured to store the trained data recognition model in a memory of the mobile robot device 1000 including the data recognition unit 1320. Alternatively, the model-training unit 1310-4 may be configured to store the trained data recognition model in a memory of the mobile robot device 1000 including the data recognition unit 1320 to be described later. Alternatively, the model-training unit 1310-4 may be configured to store the trained data recognition model in a memory of the server 2000 connected to the mobile robot device 1000 through a wired or wireless network.

In this case, a memory in which the trained data recognition model is stored may store, for example, commands or data related to at least one other component of the mobile robot device 1000. In addition, the memory may store software and/or programs. The program may include, for example, a kernel, middleware, application programming interface (API), and/or application program (or "application").

The model evaluation unit 1310-5 may be configured to input evaluation data into a data recognition model, and when the recognition result output from the evaluation data does not satisfy predetermined criteria, to cause the model-training unit 1310-4 to train again. In this case, the evaluation data may be preset data for evaluating the data recognition model.

For example, the model evaluation unit 1310-5 may be configured to evaluate that recognition result of a trained data recognition model for evaluation data does not satisfy a predetermined criteria when the number of ratio of inaccurate evaluation data among the recognition result exceeds a preset threshold. For example, in case where a predetermined criteria is defined as a ratio of 2%, when the trained data recognition model outputs incorrect recognition results for more than 20 evaluation data out of a total of 1000 evaluation data, the model evaluation unit 1310-5 may be configured to evaluate that the trained data recognition model is not suitable.

On the other hand, when there are a plurality of trained data recognition models, the model evaluation unit 1310-5 may be configured to evaluate whether or not a predetermined criteria is satisfied for each trained data recognition model, and to determine a model that satisfies the predetermined criteria as the final data recognition model. In this case, when there are a plurality of models satisfying the predetermined criteria, the model evaluation unit 1310-5 may be configured to determine any one or a predetermined number of models preset in order of highest evaluation score as the final data recognition model.

Meanwhile, at least one of the data acquisition unit 1310-1, the pre-processing unit 1310-2, the training data-selection unit 1310-3, the model-training unit 1310-4, or the model evaluation unit 1310-5 in the data-training unit 1310 may be manufactured in the form of at least one hardware chip and mounted on the mobile robot device 1000. For example, at least one of the data acquisition unit 1310-1, the pre-processing unit 1310-2, the training data-selection unit 1310-3, the model-training unit 1310-4, or the model evaluation unit 1310-5 may be manufactured in the form of a dedicated hardware chip for artificial intelligence (AI) or may be manufactured as part of an existing general-purpose processor (e.g., CPU or application processor) or graphics-only processor (e.g., GPU) and mounted on various mobile robot devices 1000 described above.

In addition, the data acquisition unit 1310-1, the pre-processing unit 1310-2, the training data-selection unit 1310-3, the model-training unit 1310-4, and the model evaluation unit 1310-5 may be mounted in one electronic device, or may be mounted on separate electronic devices, respectively. For example, some of the data acquisition unit 1310-1, the pre-processing unit 1310-2, the training data-selection unit 1310-3, the model-training unit 1310-4, and the model evaluation unit 1310-5 may be included in the mobile robot device 1000, and the other part may be included in the server 2000.

In addition, at least one of the data acquisition unit 1310-1, the pre-processing unit 1310-2, the training data-selection unit 1310-3, the model-training unit 1310-4, or the model evaluation unit 1310-5 may be implemented as a software module. When at least one of the data acquisition unit 1310-1, the pre-processing unit 1310-2, the training data-selection unit 1310-3, the model-training unit 1310-4, or the model evaluation unit 1310-5 is implemented as a software module (alternatively, a program module including an instruction), the software module may be stored in a non-transitory computer-readable media. In addition, in this case, at least one software module may be provided by an operating system (OS) or may be provided by a predetermined application. Alternatively, some of at least one software module may be provided by an operating system (OS), and the other may be provided by a predetermined application.

Figure 15:
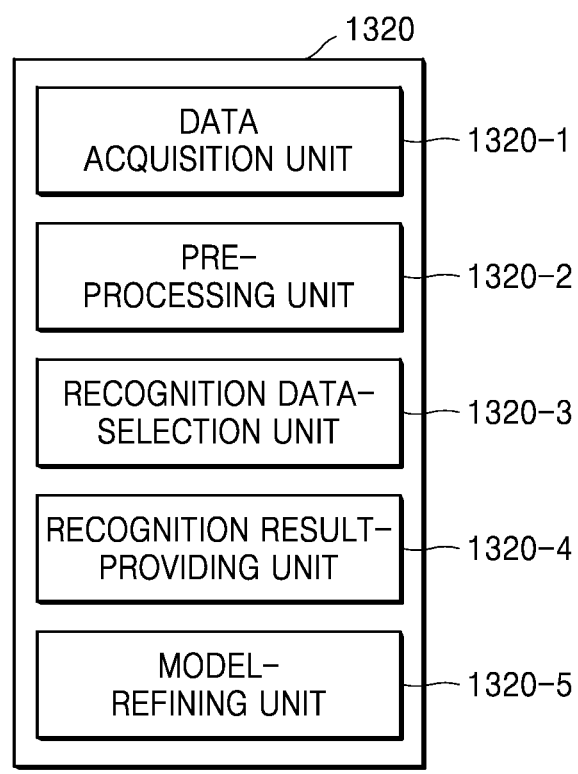
FIG. 15 is a block diagram of a data recognition unit 1320 according to some embodiments.

FIG. 15 is a block diagram of a data recognition unit 1320 according to some embodiments.

Referring to FIG. 15, according to some embodiments, a data recognition unit 1320 according to some embodiments may include a data acquisition unit 1320-1, a pre-processing unit 1320-2, a recognition data-selection unit 1320-3, a recognition result-providing unit 1320-4, and a model-refining unit 1320-5.

The data acquisition unit 1320-1 may be configured to obtain the data necessary to change a safety operation level, and the pre-processing unit 1320-2 may be configured to preprocess the obtained data such that the obtained data may be used to change a safety operation level. The pre-processing unit 1320-2 may be configured to process the obtained data in a preset format such that the recognition result-providing unit 1320-4, which will be described later, may use the obtained data to change a safety operation level.

The recognition data-selection unit 1320-3 may be configured to select data required for changing a safety operation level among the pre-processed data. The selected data may be provided to the recognition result-providing unit 1320-4. The recognition data-selection unit 1320-3 may be configured to select some or all of the pre-processed data according to preset criteria for changing a safety operation level. In addition, the recognition data-selection unit 1320-3 may also be configured to select data according to preset criteria by training by the model-training unit 1310-4, which will be described later.

The recognition result-providing unit 1320-4 may be configured to change a safety operation level by applying the selected data to a data recognition model. The recognition result-providing unit 1320-4 may be configured to provide a recognition result according to the purpose of recognizing data. The recognition result-providing unit 1320-4 may be configured to apply the selected data to a data recognition model by using data selected by the recognition data selection unit 1320-3 as an input value. In addition, the recognition result may be determined by a data recognition model.

The model-refining unit 1320-5 may be configured to refine the data recognition model based on evaluation of recognition results provided by recognition result-providing unit 1320-4. For example, the model-refining unit 1320-5 may provide a recognition result provided by the recognition result-providing unit 1320-4 to the model training unit 1310-4, so that the model-training unit 1310-4 may thereby refine the data recognition model.

Meanwhile, at least one of the data acquisition unit 1320-1, the pre-processing unit 1320-2, the recognition data-selection unit 1320-3, the recognition result-providing unit 1320-4, or the model-refining unit 1320-5 in the data recognition unit 1320, may be manufactured in the form of at least one hardware chip and mounted on the mobile robot device 1000. For example, at least one of the data acquisition unit 1320-1, the pre-processing unit 1320-2, the recognition data-selection unit 1320-3, the recognition result-providing unit 1320-4, or the model-refining unit 1320-5 may be manufactured in the form of a dedicated hardware chip for artificial intelligence (AI) or may be manufactured as part of an existing general-purpose processor (e.g., CPU or application processor) or graphics-only processor (e.g., GPU) and mounted on various types of mobile robot device 1000 described above.

In addition, the data acquisition unit 1320-1, the pre-processing unit 1320-2, the recognition data-selection unit 1320-3, the recognition result-providing unit 1320-4, and the model-refining unit 1320-5 may be mounted in one electronic device, or may be mounted on separate electronic devices, respectively. For example, some of the data acquisition unit 1320-1, the pre-processing unit 1320-2, the recognition data-selection unit 1320-3, the recognition result-providing unit 1320-4, and the model-refining unit 1320-5 may be included in the mobile robot device 1000, and the other part may be included in the server 2000.

In addition, at least one of the data acquisition unit 1320-1, the pre-processing unit 1320-2, the recognition data-selection unit 1320-3, the recognition result-providing unit 1320-4, or the model-refining unit 1320-5 may be implemented as a software module. When at least one of the data acquisition unit 1320-1, the pre-processing unit 1320-2, the recognition data-selection unit 1320-3, the recognition result-providing unit 1320-4, or the model-refining unit 1320-5 is implemented as a software module (alternatively, a program module including an instruction), the software module may be stored in a non-transitory computer-readable media. In addition, in this case, at least one software module may be provided by an operating system (OS) or may be provided by a predetermined application. Alternatively, some of at least one software module may be provided by an operating system (OS), and the other may be provided by a predetermined application.

Figure 16:
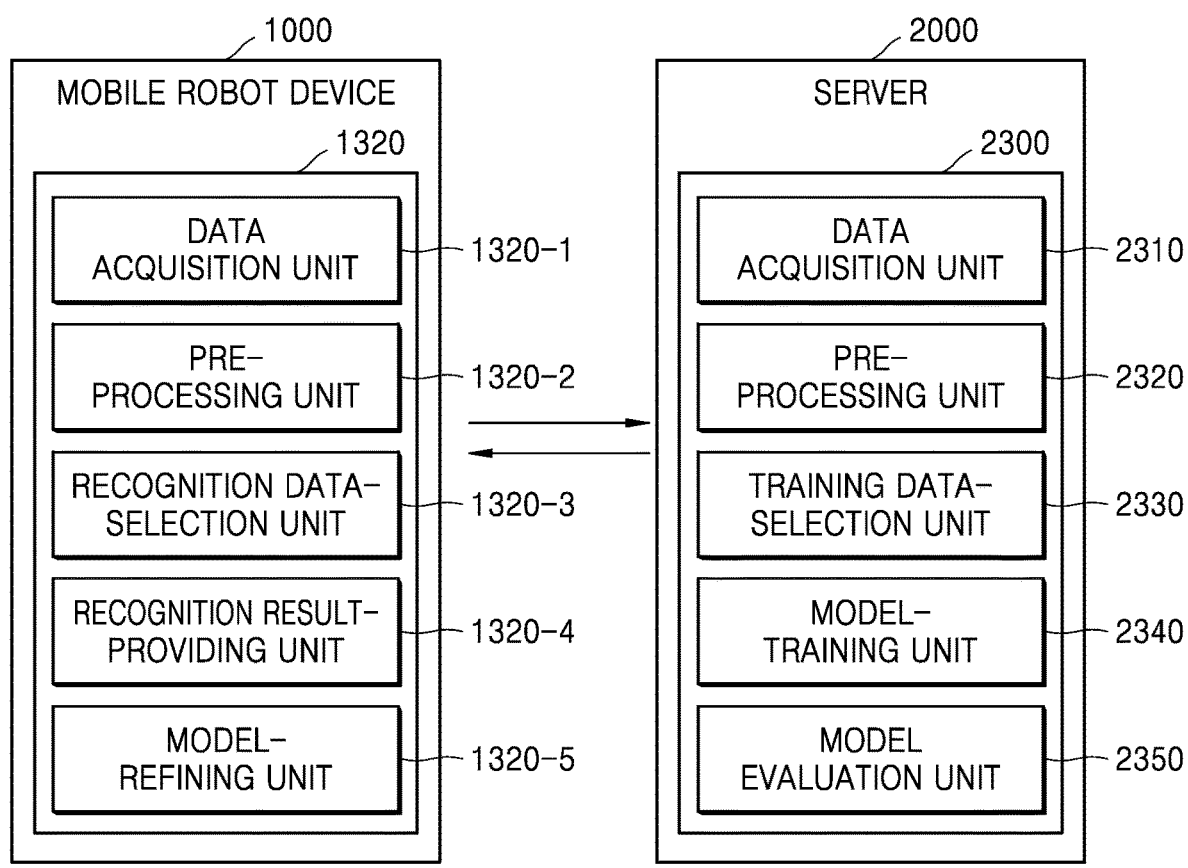
FIG. 16 is a diagram illustrating an example in which a mobile robot device 1000 and a server 2000 train and recognize data by interworking with each other, according to some embodiments.

FIG. 16 is a diagram illustrating an example in which a mobile robot device 1000 and a server 2000 train and recognize data by interworking with each other, according to some embodiments.

Referring to FIG. 16, the server 2000 may be configured to train criteria for changing a safety operation level, and the mobile robot device 1000 may be configured to change a safety operation level based on a result of the training by the server 2000.

In this case, a model-training unit 2340 of the server 2000 may perform the function of the data-training unit 1310 shown in FIG. 13. The model-training unit 2340 of server 2000 may be configured to train criteria on which data to use to change a predetermined safety operation level and how to determine a safety operation level using the data. The model-training unit 2340 may be configured to train criteria for changing a safety operation level by obtaining data to be used for training and applying the obtained data to a data recognition model to be described later.

In addition, a recognition result-providing unit 1320-4 of the mobile robot device 1000 may be configured to determine a safety operation level to be changed by applying data selected by the recognition data-selection unit 1320-3 to a data recognition model generated by the server 2000. For example, the recognition result-providing unit 1320-4 may be configured to transmit data selected by the recognition data-selection unit 1320-3 to the server 2000, and to request the server 2000 to determine a safety operation level to be changed by applying the data selected by the recognition data-selection unit 1320-3 to a recognition model. Further, the recognition result-providing unit 1320-4 may receive information on a safety operation level determined by the server 2000 from the server 2000.

For example, the mobile robot device 1000 may be configured to transmit sensing information obtained by sensing the surrounding environment of the mobile robot device 1000 to the server 2000, and to request the server 2000 to determine a safety operation level of the mobile robot device 1000 by applying the sensed information to a data recognition model. In addition, an electronic device 100 may be configured to receive a safety operation level determined by the server 2000 from the server 2000.

Alternatively, a recognition result-providing unit 1320-4 of the electronic device 100 may be configured to receive a recognition model generated by the server 2000 from the server 2000, and to determine a safety operation level to be changed using the received recognition model. In this case, the recognition result-providing unit 1320-4 of the mobile robot device 1000 may be configured to determine a situation by applying data selected by the recognition data-selection unit 1320-3 to the data recognition model received from the server 2000.

For example, the mobile robot device 1000 may be configured to change a safety operation level of the mobile robot device 1000 by applying sensing information obtained by sensing the surrounding environment of the mobile robot device 1000 to the data recognition model received from server 2000.

Some embodiments may also be embodied in the form of a recording medium including computer-executable instructions, such as a program module executed by a computer. Computer-readable media may be any available media that can be accessed by a computer, and may include both volatile and nonvolatile media, removable and non-removable media. In addition, computer-readable media may include both computer storage media and communication media. Computer storage media includes both volatile and nonvolatile, removable and non-removable media implemented in any method or technology for storage of information such as computer-readable instructions, data structures, program modules or other data. Communication media typically include computer-readable instructions, data structures, program modules, or other data in a modulated data signal such as a carrier wave, or other transmission mechanism, and include any information delivery media.

Further, in the present specification, the "unit" may be a hardware component such as a processor or a circuit, and/or a software component executed by a hardware component such as a processor.

The above description of the disclosure is for illustration only, and a person having ordinary knowledge in the art to which the disclosure pertains may understand that it can be easily modified into other specific forms without changing the technical idea or essential characteristics of the disclosure. Therefore, it should be understood that the embodiments described above are illustrative in all respects and not restrictive. For example, each component described as a single type may be implemented in a distributed manner, and similarly, components described as distributed may be implemented in a combined form.

The scope of the disclosure is indicated by the claims, which will be described later, rather than by the detailed description, and it should be interpreted that all changes or modifications derived from the meaning and scope of the claims and their equivalent concepts are included in the scope of the disclosure.

The invention claimed is:

1. A method of providing, by a mobile robot device comprising an arm device, a service to a user, the method comprising:

obtaining sensing information obtained by sensing a surrounding environment of the mobile robot device while the mobile robot device is traveling;

obtaining based on the sensing information, information about a type of person around the mobile robot device and information about the surrounding environment of the mobile robot device;

changing, based on the information about the type of person and the information about the surrounding environment, a safety operation level value of the mobile robot device; and controlling, based on the changed safety operation level value, an operation of the mobile robot device, wherein the safety operation level value is one of distinct level values for controlling an operation related to a movement of the mobile robot device and a motion of the arm device, and the mobile robot device changes the safety operation level value by applying the obtained information about the type of person and the obtained information about the surrounding environment to a training model trained using an artificial intelligence algorithm.

2. The method of claim 1, wherein the changing of the safety operation level value comprises changing the safety operation level value using the training model trained using at least one of machine learning, neural network, genes, deep learning, or classification algorithms as the artificial intelligence algorithm.

3. The method of claim 1, wherein the changing of the safety operation level value comprises:

when the information about the type of person around the mobile robot device indicates an infant, reducing a moving speed of the mobile robot device; and controlling not to change an angle of the arm device.

4. The method of claim 1, comprising, when the information about the type of person around the mobile robot device indicates a disabled person, decreasing a moving speed of the mobile robot device and increasing a moving noise of the mobile robot device.

5. The method of claim 1, wherein the changing of the safety operation level value comprises, when the information about the surrounding environment of the mobile robot device indicates that a congestion level around the mobile robot device is greater than a threshold, reducing a moving speed of the mobile robot device and changing a moving direction of the mobile robot device.

6. The method of claim 1, wherein the changing of the safety operation level value comprises, when the information about the surrounding environment of the mobile robot device indicates that a slope of a traveling route of the mobile robot device is greater than a threshold, reducing a moving speed of the mobile robot device.

7. The method of claim 1, wherein the changing of the safety operation level value comprises, when the information about the surrounding environment of the mobile robot device indicates that a risk with respect to an object located near the mobile robot device is greater than a threshold, reducing a moving speed of the mobile robot device and changing a moving direction of the mobile robot device.

8. The method of claim 1, wherein the obtaining of the sensing information comprises obtaining at least one of an image captured around the mobile robot device, or temperature information of the surrounding environment.

9. The method of claim 1, wherein the changing of the safety operation level value comprises:

transmitting the sensing information to a server; and receiving the safety operation level value determined using the training model from the server.

10. A non-transitory computer-readable recording medium in which a program for executing the method of claim 1 on a computer is recorded.

11. A mobile robot device comprising an arm device for providing a service to a user, the mobile robot device comprising:
- a memory configured to store at least one instruction;
- a sensing unit; and
- a processor configured to:
  - by executing the at least one instruction, obtain, through the sensing unit, sensing information obtained by sensing a surrounding environment of the mobile robot device while the mobile robot device is traveling,
  - obtain based on the sensing information, information about a type of person around the mobile robot device and information about the surrounding environment of the mobile robot device,
  - change, based on the information about the type of person and the information about the surrounding environment, a safety operation level value of the mobile robot device, and
  - control an operation of the mobile robot device based on the changed safety operation level value,
- wherein the safety operation level value is one of distinct level values for controlling an operation related to a movement of the mobile robot device and a motion of the arm device, and
- wherein the mobile robot device changes the safety operation level value by applying the obtained information about the type of person and the obtained information about the surrounding environment to a training model trained using an artificial intelligence algorithm.

12. The device of claim 11, wherein the processor is further configured to:
- by executing the at least one instruction, when the information about the type of person around the mobile robot device indicates an infant, control to reduce a moving speed of the mobile robot device and
- not to change an angle of the arm device.

13. The device of claim 11, wherein the processor is further configured to, by executing the at least one instruction, obtain at least one of an image captured around the mobile robot device, or temperature information of the surrounding environment through the sensing unit.

\* \* \* \* \*